US011657468B2

(12) United States Patent
Tschechne

(10) Patent No.: US 11,657,468 B2
(45) Date of Patent: May 23, 2023

(54) METHOD FOR OPTIMIZING THE LOAD FACTOR OF LUGGAGE COMPARTMENTS

(71) Applicant: Airbus Operations GmbH, Hamburg (DE)

(72) Inventor: Nicolas Tschechne, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 522 days.

(21) Appl. No.: 16/775,914

(22) Filed: Jan. 29, 2020

(65) Prior Publication Data

US 2020/0242721 A1 Jul. 30, 2020

(30) Foreign Application Priority Data

Jan. 29, 2019 (DE) ...................... 10 2019 102 144.8

(51) Int. Cl.
*G06Q 50/28* (2012.01)
*B64D 11/00* (2006.01)
*G06Q 10/02* (2012.01)
*G06T 7/62* (2017.01)

(52) U.S. Cl.
CPC ........... *G06Q 50/28* (2013.01); *B64D 11/003* (2013.01); *G06Q 10/02* (2013.01); *G06T 7/62* (2017.01); *G06T 2207/30112* (2013.01)

(58) Field of Classification Search
CPC .................................. G06Q 50/28; G06T 7/62
USPC ........................................................... 705/5
See application file for complete search history.

(56) References Cited

U.S. PATENT DOCUMENTS

| | | | | |
|---|---|---|---|---|
| 9,164,577 B2* | 10/2015 | Tapley | .................... | G06F 16/58 |
| 9,505,554 B1* | 11/2016 | Kong | ..................... | G06V 10/25 |
| 11,006,078 B1* | 5/2021 | Patel | ...................... | H04N 5/247 |
| 2006/0006704 A1* | 1/2006 | Skelly | ............... | B64D 11/0636 |
| | | | | 297/188.08 |
| 2013/0290221 A1* | 10/2013 | Jindel | .................. | B64D 11/003 |
| | | | | 705/500 |
| 2015/0248578 A1* | 9/2015 | Utsumi | ................ | H04N 13/106 |
| | | | | 382/154 |
| 2016/0109280 A1 | 4/2016 | Tiu et al. | | |
| 2016/0297533 A1* | 10/2016 | Le | ...................... | B64D 11/0639 |

(Continued)

FOREIGN PATENT DOCUMENTS

DE   10 2011 007 958 A1   7/2012
DE   10 2016 218 307 A1   3/2018

(Continued)

OTHER PUBLICATIONS

German Search Report for Application No. 10 2019 102 144.8 dated Dec. 24, 2019.

*Primary Examiner* — Allyson N Trail
(74) *Attorney, Agent, or Firm* — KDW Firm PLLC

(57) ABSTRACT

A method for optimizing the load factor of luggage compartments in an aircraft cabin for a flight includes creation of at least one digital image of a piece of luggage, which is intended to be transported in the luggage compartments during the flight, by a passenger of the flight using a camera, determination of dimensions of the piece of luggage using the at least one digital image, comparison of the previously determined dimensions with free volume in the luggage compartments in the aircraft cabin on the flight, and consideration of the result of the comparison when loading the luggage compartments before the beginning of the flight.

17 Claims, 2 Drawing Sheets

(56) References Cited

U.S. PATENT DOCUMENTS

2018/0086464 A1 3/2018 Riedel et al.
2018/0111698 A1 4/2018 Podnar et al.
2019/0325538 A1* 10/2019 Savian .................... G07F 9/023

FOREIGN PATENT DOCUMENTS

| EP | 3 270 342 A1 | 1/2018 |
| WO | WO 2005/087590 A1 | 9/2005 |
| WO | WO 2016/100610 A1 | 6/2016 |

* cited by examiner

METHOD FOR OPTIMIZING THE LOAD FACTOR OF LUGGAGE COMPARTMENTS

CROSS-REFERENCE TO RELATED APPLICATION

This application claims priority to German Patent Application No. 10 2019 102 144.8 filed Jan. 29, 2019, the entire disclosure of which is incorporated by reference herein.

TECHNICAL FIELD

The present application relates to a method for optimizing the load factor of luggage compartments in an aircraft cabin for a flight.

BACKGROUND

Since airline companies demand additional fees for checking in pieces of luggage with many tickets, the number of pieces of luggage transported in the aircraft cabin as what is known as hand luggage has increased significantly. In particular in the case of flights with a high load factor, more pieces of luggage are often transported in the aircraft cabin than can be transported in the luggage compartments arranged above the seats. The excess pieces of luggage in this case have to be stowed under the seat in front, which restricts the available leg room for the passenger and thus the comfort of the passenger, or have to be subsequently loaded into the cargo hold of the aircraft. The latter is associated with increased hassle, which often leads to a delay of the flight.

In addition, passengers regularly carry on pieces of luggage into the cabin, the dimensions of the pieces of luggage exceeding the permissible upper limits and therefore cannot be stowed in the luggage compartments or underneath the seat in front. These pieces of luggage also have to be subsequently loaded into the cargo hold, which entails the disadvantages already mentioned. In order to check the dimensions of the pieces of luggage, simple hand luggage gauges that prescribe the maximum dimensions for pieces of hand luggage are known.

SUMMARY

It is therefore an object of the disclosure herein to specify a method by way of which the load factor of the luggage compartments and in particular the overall stowage space for pieces of luggage in an aircraft cabin can be optimized.

This object is achieved by a method disclosed herein. Advantageous embodiments are disclosed herein.

A method for optimizing the load factor of luggage compartments in an aircraft cabin for a flight can comprise at least the following steps:

a) creation of at least one digital image of a piece of luggage, which is intended to be transported in the luggage compartments during the flight, by a passenger of the flight using a camera, b) determination of dimensions of the piece of luggage using the at least one digital image, c) comparison of the previously determined dimensions with free volume in the luggage compartments in the aircraft cabin on the flight taking into consideration already known dimensions of other pieces of luggage, which are likewise intended to be transported in the luggage compartment during the flight, and d) consideration of the result of the comparison when loading the luggage compartments before the beginning of the flight.

In other words, provision is made of a method in which a passenger must specify their piece or pieces of luggage that they would like to transport in the luggage compartments of the cabin even before the start of the flight, for example during check-in or even when booking their flight ticket, in order that the size or dimensions thereof can be taken into consideration when loading the aircraft. In order that the size of the pieces of luggage, which are also referred to subsequently as pieces of hand luggage, can be determined reliably, the passenger must first in a step a) create or take one or more images of their piece of luggage using a digital camera. As an alternative, the images also can be produced during check-in at a desk by a person carrying out the check-in, who in this case takes on the role of the passenger at least for step a).

In a preferred embodiment, the passenger in step a) takes the at least one digital image of the piece of luggage using the camera of a mobile telephone from a predetermined application. The application can guide the user in this case in particular also through the further steps of the method and give them information about the conditions under which the piece of luggage should be imaged as far as possible. In particular, the application can prescribe specific distances, angles of inclination or views of the piece of luggage. As an alternative, however, it is also conceivable to take the images for example using a digital camera connected to a computer, for example what is known as a webcam.

In a subsequent step, the dimensions of the piece of luggage are identified from the at least one image. Various methods by way of which the dimensions in the image or images can be identified are described below as preferred embodiments.

In a first preferred embodiment, for the determination of the dimensions in step b), various views of pieces of luggage with known dimensions are superposed on the at least one digital image of the piece of luggage. After a visual or optical comparison, the passenger selects from the various superposed views the one that shows a piece of luggage with dimensions that are as similar as possible to the dimensions of the piece of luggage to be transported.

In this embodiment, which can also be referred to as augmented reality, pieces of luggage with known dimensions are placed virtually next to the piece of luggage of the passenger or imposed thereon. From various virtual pieces of luggage, the passenger can select the one whose dimensions are closest to those of their own pieces of luggage. For example, the user can change the height, depth or width of the virtual piece of luggage until the piece of luggage superposed on the image appears to be as similar as possible to their own piece of luggage. For this, the passenger advantageously does not have to compare any numerical values but can conclude the correct dimensions purely from the visual or optical comparison between the overlaid virtual and imaged piece of luggage.

In a further preferred embodiment, for the determination of the dimensions in step b), the dimensions of the piece of luggage are calculated automatically from the at least one digital image. It is preferred here in particular when, in step a), a plurality of images of the piece of luggage that present views of the piece of luggage from various viewing directions and a similar distance are created, and, in step b), the dimensions of the piece of luggage are calculated automatically from the various images of the piece of luggage using images that show views of the piece of luggage from at least two different viewing directions.

In this embodiment, the dimensions of the piece of luggage are calculated automatically from the image or images of the user, wherein for example a plurality of images of the piece of luggage that have each been taken from different views from approximately the same distance are used for automatic measuring. By processing various views, it is possible to estimate the different dimensions of the piece of luggage as accurately as possible. This task also has the advantage that the user does not have to take action themselves but the dimensions of the piece of luggage are determined automatically.

In a further preferred embodiment, for the determination of the dimensions in step b), the at least one image is compared automatically with comparison images of pieces of luggage with known dimensions, wherein, when the piece of luggage depicted in the at least one image corresponds to a piece of luggage depicted in a comparison image, the known dimensions of the piece of luggage depicted in the comparison image are taken as dimensions of the piece of luggage to be transported.

In this preferred embodiment, the image or the images are compared with images of pieces of luggage whose dimensions are known. The images can be stored for example in a central database, which stores images of pieces of luggage whose dimensions have been determined using one of the options already described. However, it is also conceivable for the database to have been filled or to be continuously filled exclusively or additionally with images and dimensions that are provided by a service provider or for example the manufacturers of pieces of luggage. This embodiment likewise makes possible a rapid optical comparison, which in this case is even carried out purely by machine.

Of course, it is possible for a method to implement a plurality of the above embodiments. For example, it is conceivable that the passenger can select between the various methods, which could be expedient in particular when they have already been through the method at an earlier point in time with the piece of luggage to be transported in the luggage compartments and the images are stored together with the dimensions in a central database. In another implementation, the image or the images are first compared with an image of pieces of luggage with known dimensions. If the comparison is not successful, that is to say no dimensions can be identified, the central system attempts to automatically determine the dimensions in the image or images. Only if this also fails is the user asked to identify the dimensions through a comparison with a virtual piece of luggage that is superposed on the image. If all the methods should be unsuccessful, the passenger can also be requested to input the dimensions by hand. In addition, it would also be conceivable to make it possible for it to be pointed out to the passenger at the beginning of the method that the dimensions of the piece of luggage to be transported have already been detected at a previous point in time and the therefore known dimensions can be used for the rest of the method steps. In this case, there would therefore be no direct temporal correlation between steps a) and b) on the one hand and c) and d) on the other hand; however, the method would still be carried out in full for the piece of luggage.

For the sake of completeness, it should be mentioned that the method can also implement just one or two of the methods described above for determining the dimensions or else other methods not described here. The methods can also proceed one after another in different orders. For example, it is possible to verify the determination carried out by the passenger through comparison with virtual pieces of luggage by way of automatic determination.

As soon as the dimensions of the piece of luggage have been determined, in step c), the previously determined dimensions are compared with the free volume in the luggage compartments, that is to say the space required by the piece of luggage is compared with the space still remaining in the luggage compartments when the dimensions of the already known pieces of luggage that are likewise intended to be transported in the luggage compartments on the same flight are taken into consideration. The already known pieces of luggage may be pieces of luggage belonging to the same passenger or else pieces of luggage belonging to other passengers who want to take the same flight. During the comparison, consideration is preferably given to which aircraft is undertaking the flight in order that for example different dimensions of luggage compartments and different distributions of luggage compartments can be taken into consideration.

In a preferred embodiment, the comparison of the free volume in the luggage compartments in step c) also takes into consideration the free volume present underneath seats for pieces of luggage. It is thus advantageously possible to identify whether there is still any space at all in the aircraft cabin for the piece of luggage and the method overall for optimizing the load factor of the stowage space for pieces of luggage or pieces of hand luggage in an aircraft cabin for a flight needs to be extended.

Finally, in step d), even before the beginning of the flight or before the passenger boards the aircraft, the result of the comparison is taken into consideration when the luggage compartments are loaded by virtue of the loading being planned so that as many passengers as possible can store their pieces of luggage in the luggage compartments during the flight.

To this end, in a preferred embodiment, in step d), a seat for the flight underneath a luggage compartment or in the vicinity of a luggage compartment is assigned to the passenger, in which considering already known dimensions of pieces of luggage, which are likewise intended to be transported in the luggage compartments during the flight and which are carried by other passengers to which adjacent seats are assigned, sufficient volume is free to accommodate the piece of luggage. In this simple way, the passengers can be distributed in the aircraft cabin so that passengers with and without hand luggage are mixed as evenly as possible. This prevents a lot of passengers with hand luggage sitting in some areas of the aircraft for which there is insufficient space in the luggage compartments, while primarily passengers without hand luggage are sitting in other areas of the cabin and some of the luggage compartments remain unused. This also prevents passengers when boarding on the search for a hand luggage space moving past their seat through the aircraft so that the rest of the boarding process is delayed.

In an alternative or supplementary embodiment, in step d), a space in a luggage compartment for the piece of luggage is assigned to the passenger, in which sufficient volume is free to accommodate the piece of luggage. The space assigned to the piece of luggage in the luggage compartment is furthermore preferably displayed to the passenger upon boarding the aircraft. The luggage compartment can be indicated for example by indicating the seat row or the seat above which the assigned space is located. It is also conceivable for the spaces in the luggage compartments to be permanently numbered. In a further embodiment, projectors, which project for example the name of the passenger and outlines of the piece of luggage into the luggage compartment, are arranged in the luggage compartments. This makes possible particularly accurate placing of the pieces of luggage and therefore efficient use or a high degree of optimization of the load factor of the luggage compartments.

In a further alternative or supplementary preferred embodiment, in step d), the carrying of the piece of luggage in the aircraft cabin is refused to the passenger, if it has been identified in step c) that there is no free volume present in the aircraft cabin on the flight to accommodate the piece of luggage. It is thus possible to prevent more pieces of luggage being brought into the cabin than can be transported in the luggage compartments or possibly even under the seats and to prevent these pieces of luggage having to be unloaded. Instead, it is possible to suggest to the passenger that their piece of luggage be transported in the cargo hold.

It is likewise possible, in step d), for it to be communicated to the passenger that carrying on the piece of luggage in the aircraft cabin is possible only upon payment of a fee. In this way, it is possible to provide an incentive to forgo pieces of luggage or to transport them in the cargo hold.

In a preferred embodiment, step a) is carried out on a terminal device of the passenger using a predetermined application and steps c) and d) are carried out by a central system. The terminal device may be for example a mobile telephone of the passenger, whereas the central system is operated either by the airline company themselves or by a service provider.

In one embodiment, dimensions of the piece of luggage are determined in step b) on the terminal device of the passenger and, after step b) is completed, are transmitted from the terminal device of the passenger to the central system. As an alternative, the at least one image can be transmitted from the terminal device of the passenger to the central system. Step b) is carried out in this case by the central system. Which of the two alternatives, that can also otherwise be mixed, is followed depends in particular on the performance of the terminal device of the user and the method for determining the dimensions that is used. If for example a virtual piece of luggage is superposed on the image, it does not have to be necessary to transmit the images to the central system. In contrast, if a comparison with a central database is intended to be carried out, transmission to the central system is recommended. Even in the case of automatic determination of the dimensions from the images, it may be expedient to transmit the images to the central system since sufficiently high computation powers can be reliably provided there.

Finally, it is preferred for the method to be carried out for all pieces of luggage that passengers would like to transport in the luggage compartments during the flight. This ensures that no pieces of luggage that have not previously been taken into consideration are transported in the cabin.

BRIEF DESCRIPTION OF THE DRAWINGS

The disclosure herein is explained in more detail below with reference to the figures in which an example embodiment is illustrated.

DETAILED DESCRIPTION

Figure 3:
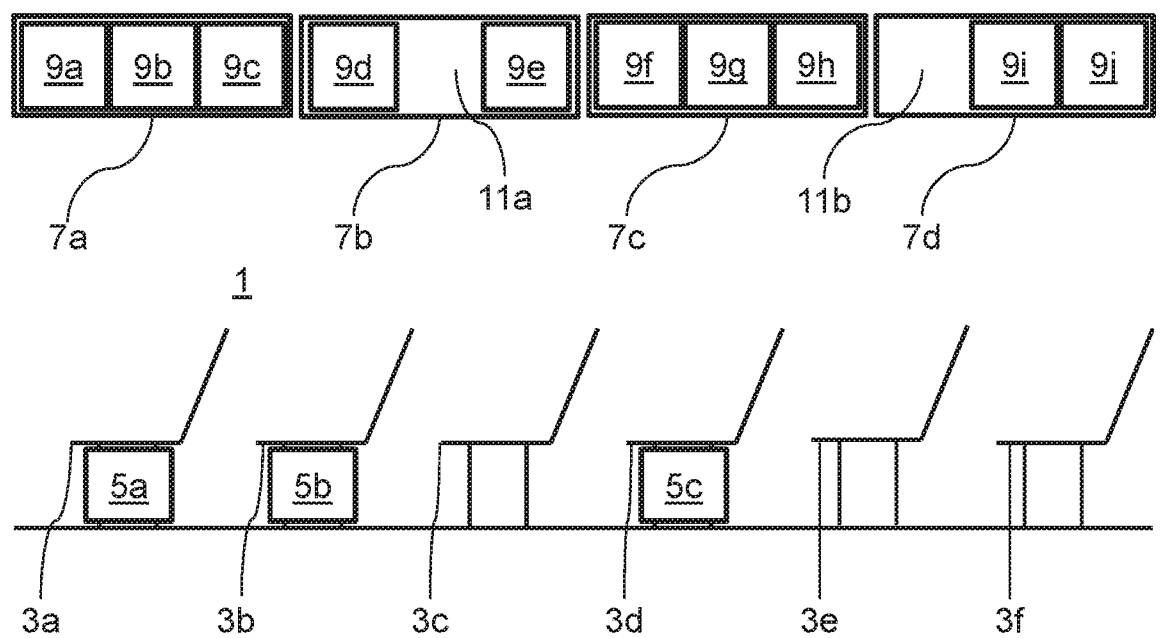
FIG. 3 shows a schematic view of an aircraft cabin with stowage space for pieces of luggage whose load factor can be optimized by way of the method from FIG. 1.

The section of an aircraft cabin 1 shown schematically in FIG. 3 comprises a plurality of seats 3a to 3f arranged in rows, underneath which pieces of luggage 5a to 5c can be stowed and therefore transported during the flight in a known manner. In the example of FIG. 3, pieces of luggage have been stowed only underneath the seats 3a, 3b and 3d, whereas there is still space or free volume available for stowing further pieces of luggage underneath the other seats 3c, 3e and 3f.

Luggage compartments 7a to 7d, in which pieces of luggage 9a to 9j are stored during a flight, are arranged above the seats. The luggage compartments 7a and 7c are already completely full with pieces of luggage, whereas there is still free volume 11a, 11b available in each of the luggage compartments 7b and 7d, that is to say further pieces of luggage can still be stored. The illustration in FIG. 3 does not actually show an already loaded cabin 1 but the plan for loading a cabin 1 before a flight.

Figure 1:
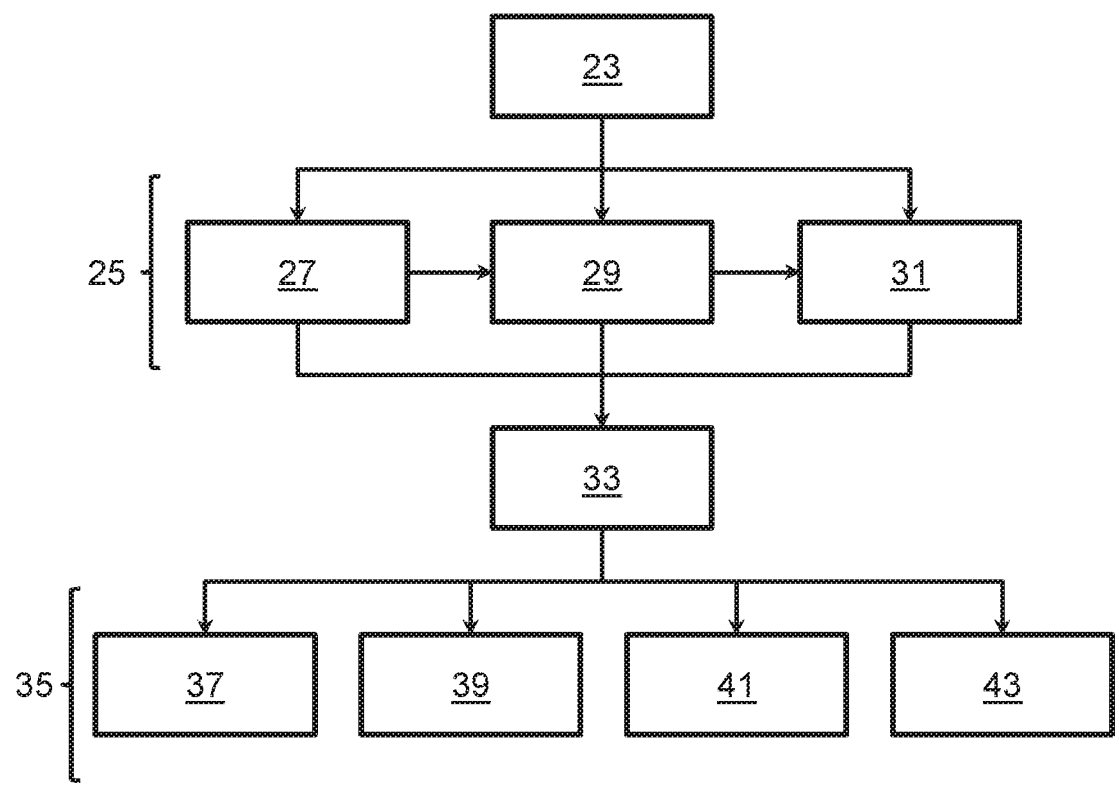
FIG. 1 shows a flow diagram of an example embodiment of a method for optimizing the load factor of the stowage space for pieces of luggage in the aircraft cabin.
Figure 2:
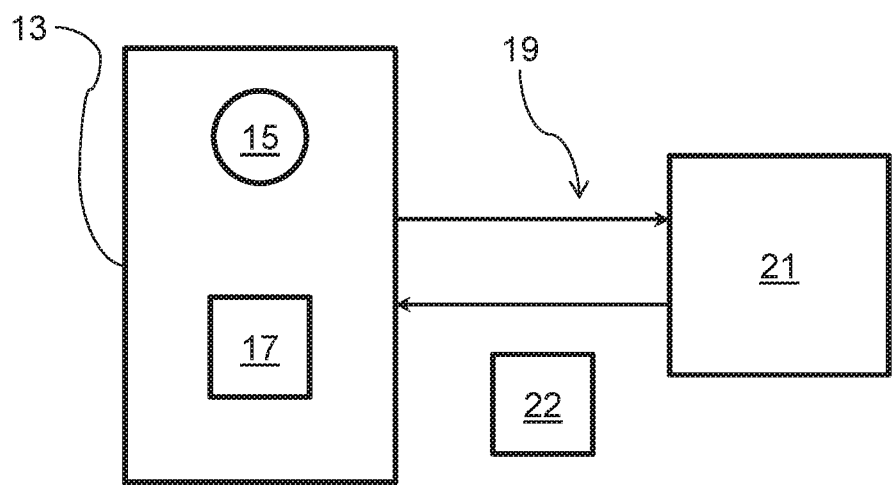
FIG. 2 shows a schematic arrangement of a terminal device of a passenger and a central system in which the example embodiment of a method according to disclosure herein is carried out.

To carry out the example embodiment of the method, a passenger uses a terminal device 13 in the form of a mobile telephone illustrated schematically in FIG. 2. In addition to a digital camera 15, the terminal device 13 comprises a central processor 17, which executes a predetermined application within the context of the method. In FIG. 3, two arrows indicate that the terminal device 13 is configured for bidirectional communication 19 with a central system 21, for example via the Internet. The central system 21 implements further steps of the method, as illustrated below in more detail. The central system is operated for example by an airline company or a service provider. Other common components of the terminal device 13 and the central system 21 are not illustrated in FIG. 2 but are well known to a person skilled in the art. Finally, FIG. 2 also shows a piece of luggage 22, which is also intended to be transported in the cabin 1.

In the first step 23 of an example embodiment of a method for optimizing the load factors of luggage compartments 7a to 7d in an aircraft cabin 1, a passenger creates a plurality of images of the piece of luggage 22 using the digital camera 15 of the mobile telephone 13. The piece of luggage 22 is intended to be transported during a determined flight in the aircraft cabin 1 preferably in one of the luggage compartments 7a to 7d or else at least underneath one of the seats 3a to 3f. An application executed by the processor 17 supports the passenger when creating suitable images of the piece of luggage 22, in which it proposes for example specific image angles and checks that the user keeps an at least approximately constant distance between the camera 15 and the piece of luggage 22.

Dimensions of the piece of luggage 22 are determined in a second step 25 based on the images. To this end, the method implements three alternative methods 27, 29, 31, which are described in more detail below. After the passenger has produced the images of the piece of luggage 22 in step 23, the method proceeds automatically to the first method 27. The second and the third method 29, 31 are carried out only if the respective preceding method 27, 29 was unable to successfully determine the dimensions. However, the application can also make it possible for the passenger themselves to select a specific method 27, 29, 31 that they would like to use for the determination of the dimensions.

In the first method 27, the images are transmitted from the terminal device 13 to the central system 21 and compared there with images of pieces of luggage 5a to 5c, 9a to 9j whose dimensions are known. The dimensions and the images of the pieces of luggage 5a to 5c, 9a to 9j are stored in a database, which is part of the central system 21. For example, the database stores the dimensions and images of the pieces of luggage 5a to 5c, 9a to 9j that have already been stowed in the luggage compartments 7a to 7d or underneath the seats 3a to 3f or that are already known to be intended to be stowed there during the flight. If during the automatic comparison of the images the system 21 determines that the piece of luggage 22 illustrated in the images is a piece of luggage 22 with known dimensions, the dimensions stored with respect to the corresponding images are taken and the method proceeds to the third step 33. The dimensions of the piece of luggage 22 to be transported can thus in a simple manner be determined particularly efficiently and reliably through automated comparison of images by way of methods known to a person skilled in the art.

However, if the comparison was unsuccessful, the method changes to the second method 29 in which the dimensions of the piece of luggage 22 are calculated automatically from the images. In this case, advantageously, no further inputs of the passenger are necessary. If the calculation is successful, the method proceeds to the third step 33.

However, if the calculations are unsuccessful, the method proceeds automatically to the third method 31, in which one or more of the images of the piece of luggage 22 are shown to the passenger, wherein virtual pieces of luggage with known dimensions are superposed on the images. The passenger can scroll through various virtual pieces of luggage, for example by swiping gestures that are conventional for mobile telephones with a touch-sensitive screen. As soon as the passenger is shown a virtual piece of luggage whose dimensions correspond to the dimensions of their piece of luggage based in their view only on the visual comparison, the passenger selects the piece of luggage and the dimensions of the virtual piece of luggage are passed on to the third method step 33.

In the third method step, the previously determined dimensions of the piece of luggage 22 and the free volume 11a, 11b for which no pieces of luggage 9a to 9j are provided yet in the luggage compartments 7a to 7d are compared. In addition, the method can also take into consideration the stowage spaces for pieces of luggage underneath the seats 3c, 3e and 3f, for which likewise no pieces of luggage 5a to 5c are provided yet. Depending on the result of the comparison in the third step 33, the method provides different options in the fourth step 35 for taking into consideration the results of the comparison during loading of the luggage compartments 7a to 7d and the stowage spaces underneath the seats 3a to 3f.

For example, if the comparison has resulted in there still being sufficient stowage space or free volume 11a, 11b for the piece of luggage 22 in one of the luggage compartments 7b, 7d, in step 37 the passenger is assigned for example the space 3c, which is for instance beneath the luggage compartment 7b with the free volume 11a. In this way, the passenger sits on a seat 3c above which, taking into consideration the already known pieces of luggage 5a to 5c, 9a to 9j, which are intended to be transported in the cabin 1, there is still free stowage space 11a, 11b in the luggage compartments 7a to 7d. As an alternative, the seat 3f could also be assigned to the passenger.

As an alternative or in addition, in step 39 a specific free volume 11a, 11b in one of the luggage compartments 7b, 7d could be assigned to the passenger, wherein the volume 11a, 11b is shown to the passenger upon boarding by way of a projector (not illustrated in FIG. 3), which projects their name and the dimensions of the piece of luggage 22 into the luggage compartment 7b, 7d at the location at which the piece of luggage 22 is intended to be stored.

If it should be found that the free volume 11a, 11b is insufficient for the piece of luggage 22, in step 37 for example the seats 3d or 3f could be assigned to the passenger and it could be communicated to them that the piece of luggage 22 is to be stowed underneath the respective seat 3c or 3e in front. This prevents passengers loading pieces of luggage 22 into the luggage compartments 7a to 7d that are too large for them.

If it is determined in step 33 that there is insufficient free volume 11a, 11b present in the cabin 1, it can be communicated to the passenger in step 41 that the piece of luggage 22 cannot be transported in the cabin 1 and has to be forgone, that is to say transported in the cargo hold.

In addition, in step 43 it is possible to communicate to the passenger that the piece of luggage 22 can be transported in the luggage compartment 7a to 7d only upon payment of a fee. For example, an airline can in principle demand fees for hand luggage depending on the size thereof, or else permit the use of the luggage compartments 7a to 7d only upon payment of a fee. This also prevents excessively large amounts of pieces of luggage being transported in the cabin 1 since passengers are generally conscious of costs and avoid carrying on excessively large or too many pieces of luggage when they have to pay fees therefor.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for optimizing a load factor of luggage compartments in an aircraft cabin for a flight, comprising steps of:
   a) creating at least one digital image of a piece of luggage, which is intended to be transported in the luggage compartments during the flight, by a passenger of the flight using a camera;
   b) determining dimensions of the piece of luggage using the at least one digital image;
   c) comparing the determined dimensions with free volume in the luggage compartments in the aircraft cabin on the flight using already known dimensions of other pieces of luggage, which are also intended to be transported in the luggage compartments during the flight; and d) considering a result of the comparison when loading the luggage compartments before a beginning of the flight;

wherein the comparing of the free volume in the luggage compartments in step c) also uses a free volume present underneath seats for pieces of luggage.

2. The method according to claim 1, wherein the passenger in step a) takes the at least one digital image of the piece of luggage using a camera of a mobile telephone from a predetermined application.

3. The method according to claim 1, wherein, for the determining of the dimensions in step b), various views of pieces of luggage with known dimensions are superposed on the at least one digital image of the piece of luggage and the passenger, after a visual comparison, selects from the various superposed views one that shows a piece of luggage with dimensions that are as similar as possible to the dimensions of the piece of luggage to be transported.

4. The method according to claim 1, wherein, for the determining of the dimensions in step b), the dimensions of the piece of luggage are calculated automatically from the at least one digital image.

5. The method according to claim 4, wherein:
in step a), a plurality of images of the piece of luggage that present views of the piece of luggage from various viewing directions and a similar distance are created; and
in step b), the dimensions of the piece of luggage are calculated automatically from the various images of the piece of luggage using images that show views of the piece of luggage from at least two different viewing directions.

6. The method according to claim 1, wherein, for the determining of the dimensions in step b), the at least one image is compared automatically with comparison images of pieces of luggage with known dimensions, wherein, when the piece of luggage depicted in the at least one image corresponds to a piece of luggage depicted in a comparison image, the known dimensions of the piece of luggage depicted in the comparison image are taken as the dimensions of the piece of luggage to be transported.

7. The method according to claim 1, wherein, in step d), a seat for the flight underneath a luggage compartment or in a vicinity of a luggage compartment is assigned to the passenger, in which, using already known dimensions of pieces of luggage, which are also intended to be transported in the luggage compartments during the flight and which are carried on by other passengers to which adjacent seats are assigned, sufficient volume is free to accommodate the piece of luggage.

8. The method according to claim 1, wherein, in step d), a space in a luggage compartment for the piece of luggage is assigned to the passenger, in which sufficient volume is free to accommodate the piece of luggage, and the space assigned to the piece of luggage in the luggage compartment is displayed to the passenger upon boarding the aircraft.

9. The method according to claim 1, wherein, in step d), the passenger is not allowed to carry on the piece of luggage in the aircraft cabin when, in step c), it has been determined that there is no free volume present in the aircraft cabin on the flight to accommodate the piece of luggage.

10. The method according to claim 1, wherein, in step d), it is communicated to the passenger that carrying on the piece of luggage in the aircraft cabin is possible only upon payment of a fee.

11. The method according to claim 1, wherein step a) is carried out on a terminal device of the passenger using a predetermined application and steps c) and d) are carried out by a central system.

12. The method according to claim 11, wherein the dimensions of the piece of luggage are determined in step b) on the terminal device of the passenger and, after step b) is completed, are transmitted from the terminal device of the passenger to the central system.

13. The method according to claim 11, wherein the at least one image is transmitted from the terminal device of the passenger to the central system and step b) is carried out by the central system.

14. The method according to claim 1, wherein the method is carried out for all pieces of luggage that passengers transport in the luggage compartments during the flight.

15. A method for optimizing a load factor of luggage compartments in an aircraft cabin for a flight, comprising steps of:
a) creating at least one digital image of a piece of luggage, which is intended to be transported in the luggage compartments during the flight, by a passenger of the flight using a camera;
b) determining dimensions of the piece of luggage using the at least one digital image;
c) comparing the determined dimensions with free volume in the luggage compartments in the aircraft cabin on the flight using already known dimensions of other pieces of luggage, which are also intended to be transported in the luggage compartments during the flight; and
d) considering a result of the comparison when loading the luggage compartments before a beginning of the flight;
wherein, in step d), a seat for the flight underneath a luggage compartment or in a vicinity of a luggage compartment is assigned to the passenger, in which, using already known dimensions of pieces of luggage, which are also intended to be transported in the luggage compartments during the flight and which are carried on by other passengers to which adjacent seats are assigned, sufficient volume is free to accommodate the piece of luggage.

16. The method according to claim 15, wherein the passenger in step a) takes the at least one digital image of the piece of luggage using a camera of a mobile telephone from a predetermined application.

17. The method according to claim 15, wherein, for the determining of the dimensions in step b), various views of pieces of luggage with known dimensions are superposed on the at least one digital image of the piece of luggage and the passenger, after a visual comparison, selects from the various superposed views one that shows a piece of luggage with dimensions that are as similar as possible to the dimensions of the piece of luggage to be transported.

* * * * *